(12) United States Patent
Hirayama et al.

(10) Patent No.: US 10,835,976 B2
(45) Date of Patent: Nov. 17, 2020

(54) METHOD FOR MANUFACTURING COOLING UNIT

(71) Applicant: NIPPON LIGHT METAL COMPANY, LTD., Tokyo (JP)

(72) Inventors: Tomoyuki Hirayama, Shizuoka (JP); Yuichi Kikuchi, Shizuoka (JP); Tatsunori Akimoto, Shizuoka (JP); Kazuhito Seki, Shizuoka (JP); Akihiro Mogi, Shizuoka (JP); Takao Otaki, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 268 days.

(21) Appl. No.: 15/767,185

(22) PCT Filed: Oct. 7, 2016

(86) PCT No.: PCT/JP2016/004519
§ 371 (c)(1),
(2) Date: Apr. 10, 2018

(87) PCT Pub. No.: WO2017/073021
PCT Pub. Date: May 4, 2017

(65) Prior Publication Data
US 2018/0304390 A1 Oct. 25, 2018

(30) Foreign Application Priority Data
Oct. 26, 2015 (JP) .................. 2015-209726

(51) Int. Cl.
*B23K 1/00* (2006.01)
*B23K 1/002* (2006.01)
(Continued)

(52) U.S. Cl.
CPC .............. *B23K 1/0012* (2013.01); *B23K 1/00* (2013.01); *B23K 1/002* (2013.01); *B23K 1/19* (2013.01);
(Continued)

(58) Field of Classification Search
CPC .......... B23K 1/0012; B23K 1/002; C22F 1/05
See application file for complete search history.

(56) References Cited

U.S. PATENT DOCUMENTS 2,981,520 A * 4/1961 Chadburn ................. F28F 3/12
165/170
3,087,046 A * 4/1963 Mellinger ............. B23K 1/0014
219/85.17
(Continued)

FOREIGN PATENT DOCUMENTS

| JP | 05125502 A | * | 5/1993 |
| JP | H05125502 A | | 5/1993 |

(Continued)

OTHER PUBLICATIONS

Machine translation of Japan Patent No. 5-125,502-A, Mar. 2020.*
(Continued)

*Primary Examiner* — Geoffrey S Evans
(74) *Attorney, Agent, or Firm* — Rankin, Hill & Clark LLP

(57) ABSTRACT

Provided is a manufacturing method for a cooler, including brazing: a cooling plate (10) made of an aluminum alloy containing 0.35 mass % to 0.9 mass % of Mg and 0.2 mass % to 0.9 mass % of Si and having a substantially flat rectangular cross section; first and second refrigerant introduction members (20, 30) each made of an aluminum alloy, which are connected to end portions of the cooling plate (10); and a refrigerant supply pipe (26) and a refrigerant discharge pipe (28) each made of an aluminum alloy, which (Continued)

are connected to a refrigerant supply port (25) and a refrigerant discharge port (27), respectively, the refrigerant supply port (25) and the refrigerant discharge port (27) being arranged in one of the first and second refrigerant introduction members (20, 30), to each other, wherein the brazing includes subjecting a connecting portion of the cooling plate (10), the first and second refrigerant introduction members (20, 30), the refrigerant supply pipe (26), and the refrigerant discharge pipe (28) to high-frequency brazing with an aluminum alloy brazing filler metal containing 27 mass % to 37 mass % of Cu and 5 mass % to 10 mass % of Si, with the balance being Al and inevitable impurities, and a fluoride-based flux containing 11 mass % or more of CsF as a solid content through heating with a high-frequency heating coil.

15 Claims, 14 Drawing Sheets

(51) Int. Cl.
| | |
|---|---|
| *C22F 1/05* | (2006.01) |
| *H01M 10/6554* | (2014.01) |
| *H01M 10/651* | (2014.01) |
| *H01M 10/625* | (2014.01) |
| *H01M 10/653* | (2014.01) |
| *H01M 10/6556* | (2014.01) |
| *H01M 10/6568* | (2014.01) |
| *C22C 21/00* | (2006.01) |
| *H01M 10/613* | (2014.01) |
| *B23K 1/19* | (2006.01) |
| *B23K 35/28* | (2006.01) |
| *B23K 35/02* | (2006.01) |
| *C22F 1/00* | (2006.01) |
| *C22C 21/02* | (2006.01) |
| *C22C 21/08* | (2006.01) |
| *C22C 21/14* | (2006.01) |

(52) U.S. Cl.
CPC .......... *B23K 35/0244* (2013.01); *B23K 35/28* (2013.01); *B23K 35/286* (2013.01); *C22C 21/00* (2013.01); *C22F 1/05* (2013.01); *H01M 10/613* (2015.04); *H01M 10/625* (2015.04); *H01M 10/651* (2015.04); *H01M 10/653* (2015.04); *H01M 10/6554* (2015.04); *H01M 10/6556* (2015.04); *H01M 10/6568* (2015.04); *C22C 21/02* (2013.01); *C22C 21/08* (2013.01); *C22C 21/14* (2013.01); *C22F 1/00* (2013.01)

(56) References Cited

U.S. PATENT DOCUMENTS

| | | | |
|---|---|---|---|
| 2005/0061804 A1* | 3/2005 | Golm | B23K 1/002 |
| | | | 219/635 |
| 2013/0199763 A1 | 8/2013 | Yanagida | |
| 2017/0028591 A1* | 2/2017 | Nakahara | C25D 11/04 |
| 2018/0016665 A1* | 1/2018 | Parson | C22C 21/00 |
| 2018/0093355 A1* | 4/2018 | Sato | B23K 35/22 |
| 2018/0105900 A1* | 4/2018 | Shishido | C22C 21/08 |
| 2018/0238642 A1* | 8/2018 | Seki | H01M 10/613 |

FOREIGN PATENT DOCUMENTS

| | | | | |
|---|---|---|---|---|
| JP | 10078295 | A | * | 3/1998 |
| JP | H10078295 | A | | 3/1998 |
| JP | H10216930 | A | | 8/1998 |
| JP | 2002263879 | A | | 9/2002 |
| JP | 2004-198004 | A | | 7/2004 |
| JP | 2006116551 | A | | 5/2006 |
| JP | 2007083271 | A | * | 4/2007 |
| JP | 2007083271 | A | | 4/2007 |
| JP | 2010185647 | A | | 8/2010 |
| JP | 2012199149 | A | | 10/2012 |
| JP | 2013254787 | A | | 12/2013 |
| JP | 201565091 | A | | 4/2015 |

OTHER PUBLICATIONS

Machine translation of Japan Patent No. 10-078,295 Mar. 2020.*
Machine translation of Japan Patent No. 2007-083,271 , Mar. 2020.*
Chinese Office Action (CN OA) dated Dec. 26, 2019 for the corresponding Chinese Patent Application No. 201680062204.5.
International Search Report dated Dec. 13, 2016 filed in PCT/JP2016/004519.
Extended European Search Report dated May 14, 2019 for EP Patent Application No. 16859261.6.
Japanese Office Action dated Mar. 26, 2019 for the corresponding Japanese Patent Application No. 2017-547602; machine translation.

* cited by examiner

METHOD FOR MANUFACTURING COOLING UNIT

Name of the Parties to a Joint Research Agreement NIKKEI HEAT EXCHANGER COMPANY, LTD.

TECHNICAL FIELD

The present invention relates to a manufacturing method for a cooler to be used for cooling of a battery for a vehicle, such as an electric automobile or a hybrid automobile.

BACKGROUND ART

In general, in a vehicle, such as an electric automobile or a hybrid automobile, a battery is used as a power supply for a motor configured to drive the vehicle, and a large-capacity battery is used in order to accelerate the vehicle by driving the motor at the time of start or during traveling of the vehicle and to control the vehicle by braking at the time of sudden stop.

In order to suppress degradation of performance caused by an increase in temperature of the battery, it is required to forcibly cool the battery through use of a cooler.

In the case of a cooler including a refrigerant flow passage, in order to uniformly cool a heat-generating object (battery), for example, the cooler is required to have air-tightness and flatness, and a constituent member of the cooler is required to have strength and a thermal conductivity.

As a cooler of such type of the related art, there is known a battery temperature controller (cooler) having the following structure. That is, a refrigerant flow passage is formed in a cooling plate arranged in a bottom portion of a battery. The cooling plate is cooled with vaporization heat of a refrigerant supplied to the refrigerant flow passage, and heat of the battery is transferred to the cooled cooling plate, to thereby cool the battery (see, for example, Patent Literature 1).

The battery temperature controller (cooler) of Patent Literature 1 is obtained by integrally brazing: a flat heat exchanger in which a pair of upper and lower plates each including a flow passage partitioned by a rib are laminated on each other; a pipe for supplying the refrigerant; and a pipe for discharging the refrigerant, to each other through furnace brazing, to thereby form the refrigerant flow passage.

However, a brazing method described in Patent Literature 1 requires accurate dimension control at the time of assembly for forming the refrigerant flow passage. In addition, a material softens through heating at the time of brazing, and heat strain is generated through cooling after the brazing, with the result that flatness may be impaired.

In addition, as a method of brazing only a required portion through heating, a torch brazing method (for example, see Patent Literature 2) and a high-frequency brazing method (for example, see Patent Literature 3) are known.

The torch brazing method and the high-frequency brazing method, in each of which a heating portion is limited, have the following features:

members to be joined are not reduced in strength in their entirety;

facility cost and facility scale are small as compared to furnace brazing; and an operation can be performed in a short time period and automation can be easily performed.

In addition, a brazing method described in Patent Literature 2 includes determining a change in state of a brazing filler metal through photographing, and controlling heating conditions based on the resultant data.

In addition, a high-frequency brazing method described in Patent Literature 3 includes performing cooling by allowing a cooling medium to flow through an induction coil in order to prevent, for example, damage owing to an increase in temperature.

CITATION LIST

Patent Literature

[PTL 1] JP 2012-199149 A (paragraphs 0024 and 0028, and FIG. 4 and FIG. 5)
[PTL 2] JP 2002-263879 A (FIG. 1)
[PTL 3] JP 10-216930 A (Scope of Claims, and FIG. 9 and FIG. 10)

SUMMARY OF INVENTION

Technical Problem

However, brazing of aluminum has the following risk: the melting temperature (about 577° C.) of a brazing filler metal and the melting temperature (610° C. or more) of a base material are close to each other, and hence a temperature is locally excessively increased depending on heating conditions, with the result that a melting defect occurs in the base material.

As described above, when a melting defect occurs in the base material, there are risks in that the airtightness and flatness of the cooler cannot be maintained, and the strength and thermal conductivity of the constituent member of the cooler are reduced.

In the method described in Patent Literature 3, the cooling medium is allowed to flow through the induction coil for cooling to a temperature or less at which the strength is not impaired. However, by the method, only a heat source for a brazing portion can be cooled, and a portion in the vicinity of the heat source is not cooled. Therefore, strength may be reduced owing to the temperature of the portion.

In addition, there is a need to secure a flow passage for allowing a refrigerant for cooling to flow through the induction coil in advance, and hence there is a risk in that members to be joined (product) are limited in their shapes.

The present invention has been made in view of the above-mentioned circumstances, and an object of the present invention is to provide a manufacturing method for a cooler, which enables brazing at low brazing temperature and thus facilitates temperature control at the time of brazing, and which is capable of maintaining the airtightness and flatness of a cooler and increasing the strength and thermal conductivity of a constituent member of the cooler.

Solution to Problem

In order to achieve the above-mentioned object, according to one embodiment of the present invention, there is provided a manufacturing method for a cooler, the manufacturing method including brazing: a cooling plate made of an aluminum alloy containing 0.35 mass % to 0.9 mass % of Mg and 0.2 mass % to 0.9 mass % of Si, which includes a plurality of refrigerant flow passages along a longitudinal direction, and which is formed into a substantially flat rectangular shape in cross section with a flat upper part and a flat lower part facing each other; a first refrigerant introduction member and a second refrigerant introduction member each made of an aluminum alloy, which are connected to end portions of the cooling plate in the longitudinal direction; and a refrigerant supply pipe and a refrigerant discharge pipe each made of an aluminum alloy which are connected to a refrigerant supply port and a refrigerant discharge port, respectively, the refrigerant supply port and the refrigerant discharge port being arranged in one of the first refrigerant introduction member and the second refrigerant introduction member, to each other, wherein the brazing includes subjecting a connecting portion of the cooling plate, the first refrigerant introduction member and the second refrigerant introduction member, the refrigerant supply pipe, and the refrigerant discharge pipe to high-frequency brazing with an aluminum alloy brazing filler metal containing 27 mass % to 37 mass % of Cu and 5 mass % to 10 mass % of Si, with the balance being Al and inevitable impurities, and a fluoride-based flux containing 11 mass % or more of CsF as a solid content through heating with a high-frequency heating coil.

Herein, the reason why the composition of the cooling plate is limited to the above-mentioned range is as described below. When the cooler is mounted to a battery, the cooler needs to be mounted without a gap so that cooling efficiency is not impaired, and hence some degree of strength is required. Therefore, the content of Mg is set to from 0.35 mass % to 0.9 mass %. When the content of Mg is less than 0.35 mass %, sufficient strength is not obtained. Meanwhile, Mg vaporizes at around 550° C. and inhibits a brazing property, and hence when Mg is contained at above 0.9 mass %, preferably above 0.6 mass %, the brazing property is reduced. For the above-mentioned reason, the content of Mg is preferably from 0.35 mass % to 0.9 mass %. Further, the content of Mg is more preferably from 0.35 mass % to 0.6 mass %.

In addition, the reason why the content of Si in the cooling plate is limited to from 0.2 mass % to 0.9 mass % is as described below. When the content of Si is less than 0.2 mass %, sufficient strength is not obtained. Meanwhile, when the content of Si is more than 0.9 mass %, the melting point of a material (base material) is reduced, and local melting occurs at the time of brazing. For the above-mentioned reason, the content of Si is preferably from 0.2 mass % to 0.9 mass %.

In addition, the reason why the content of CsF in the flux is limited to 11 mass % or more is as described below. When the content of CsF is less than 11 mass %, the melting temperature of the flux is not reduced sufficiently, and hence the brazing cannot be performed at 530° C.

With the above-mentioned configuration, the brazing can be performed at a brazing temperature (530° C. or more) lower than a general brazing temperature (580° C. or more) through use of the aluminum alloy brazing filler metal containing 27 mass % to 37 mass % of Cu and 5 mass % to 10 mass % of Si, with the balance being Al and inevitable impurities, and the fluoride-based flux containing CsF. With this, a difference from the melting temperature of the cooling plate, serving as a base material, is increased, and hence temperature control can be easily performed at the time of brazing, with the result that occurrence of a melting defect in the cooling plate owing to an excessively increased local temperature can be prevented.

According to one embodiment of the present invention, in the above-mentioned embodiment of the present invention, the brazing includes, at a time of the high-frequency brazing, cooling a portion in a vicinity of a brazing portion by cooling means using a refrigerant for cooling.

According to one embodiment of the present invention, there is provided a manufacturing method for a cooler, the manufacturing method including brazing: a cooling plate made of an aluminum alloy containing 0.35 mass % to 0.9 mass % of Mg and 0.2 mass % to 0.9 mass % of Si, which includes a plurality of refrigerant flow passages along a longitudinal direction, and which is formed into a substantially flat rectangular shape in cross section with a flat upper part and a flat lower part facing each other; a first refrigerant introduction member and a second refrigerant introduction member each made of an aluminum alloy, which are connected to end portions of the cooling plate in the longitudinal direction; and a refrigerant supply pipe and a refrigerant discharge pipe each made of an aluminum alloy which are connected to a refrigerant supply port and a refrigerant discharge port, respectively, the refrigerant supply port and the refrigerant discharge port being arranged in one of the first refrigerant introduction member and the second refrigerant introduction member, to each other, wherein the brazing includes subjecting a connecting portion of the cooling plate, the first refrigerant introduction member and the second refrigerant introduction member, the refrigerant supply pipe, and the refrigerant discharge pipe to high-frequency brazing through heating with a high-frequency heating coil while cooling a portion in a vicinity of a brazing portion by cooling means using a refrigerant for cooling.

In the embodiment of the present invention, the refrigerant for cooling desirably includes any one of water, an alcohol, a mixture liquid thereof, compressed air, or a gel medium, and a cooling temperature of the portion in a vicinity of a brazing portion is preferably 200° C. or less.

With the above-mentioned configurations, a particular portion close to a portion to be heated through the high-frequency brazing, for example, the portion in the vicinity of a brazing portion on an end portion side of the cooling plate in the longitudinal direction can be cooled from an outside of the cooling plate to be kept at a temperature or less at which the strength is not impaired.

In one embodiment of the present invention, the manufacturing method preferably further includes: forming the cooling plate as an extruded profile; forming a first cutout portion at one end of the cooling plate in the longitudinal direction, the first cutout portion being opened on an upper side and at an end portion in the longitudinal direction while leaving both side walls in a width direction and a partition wall, and forming, in the first cutout portion, a step portion at an opening end of the upper part, side wall step portions at upper ends of both the side walls, and partition wall step portions at upper ends of the partition wall; forming a second cutout portion at another end of the cooling plate in the longitudinal direction, the second cutout portion being opened on the upper side and at an end portion in the longitudinal direction while leaving both the side walls in the width direction, and forming, in the second cutout portion, a step portion at an opening end of the upper part, and side wall step portions at upper ends of both the side walls; high-frequency brazing a refrigerant supply side half segment and a refrigerant discharge side half segment to the step portion, the side wall step portions, and the partition wall step portions in the first cutout portion, and end portions of both the side walls on one end side, the refrigerant supply side half segment including a horizontal part in which the refrigerant supply port is arranged and constituting the first refrigerant introduction member, the refrigerant discharge side half segment including a horizontal part in which the refrigerant discharge port is arranged and constituting the first refrigerant introduction member; and high-frequency brazing the second refrigerant introduction member including a horizontal part to the step portion in the second cutout portion and end portions of both the side walls on another end side.

In this case, the cooling plate desirably includes flange portions for mounting, which extend along the longitudinal direction of the cooling plate on both the side walls of the cooling plate in the width direction.

With the above-mentioned configurations, the refrigerant supply side half segment including a horizontal part in which the refrigerant supply port is arranged and constituting the first refrigerant introduction member and the refrigerant discharge side half segment including a horizontal part in which the refrigerant discharge port is arranged and constituting the first refrigerant introduction member can be high-frequency brazed to the first cutout portion formed at one end of the cooling plate formed of the extruded profile in the longitudinal direction with the aid of the step portion, the side wall step portions, and the partition wall step portions formed in the first cutout portion, and the second refrigerant introduction member including a horizontal part can be high-frequency brazed to the second cutout portion formed at another end of the cooling plate in the longitudinal direction with the aid of the step portion formed in the second cutout portion.

In one embodiment of the present invention, the manufacturing method preferably further includes, before the brazing, subjecting the cooling plate to solution treatment and subsequent quenching, followed by subjecting the cooling plate to artificial age hardening treatment.

With the above-mentioned configuration, a strength increasing effect is obtained through the artificial age hardening treatment.

Advantageous Effects of Invention

According to the present invention, with the above-mentioned configurations, the following effects are obtained.

(1) According to the invention, brazing at low brazing temperature is enabled and thus temperature control at the time of brazing is facilitated. Thus, the airtightness and flatness of the cooler can be maintained, and the strength and thermal conductivity of a constituent member of the cooler can be increased.

(2) According to the inventions, a particular portion close to a portion to be heated through the high-frequency brazing can be cooled from an outside of the cooling plate to be kept at a temperature or less at which the strength is not impaired, and hence the temperature control at the time of brazing is further facilitated, the strength of the constituent member of the cooler can be further increased, and the flatness can be further maintained.

(3) According to the inventions, in addition to the above-mentioned effects (1) and (2), the airtightness and flatness of the cooler can be further maintained, and the strength and thermal conductivity of the constituent member of the cooler can be further increased.

(4) According to the invention, in addition to the above-mentioned effects (1) to (3), the strength of the cooling plate can be further increased, and the strength of the cooler can be increased.

DESCRIPTION OF EMBODIMENTS

Now, embodiments of the present invention are described in detail with reference to the accompanying drawings.

<Cooler>

Figure 1:
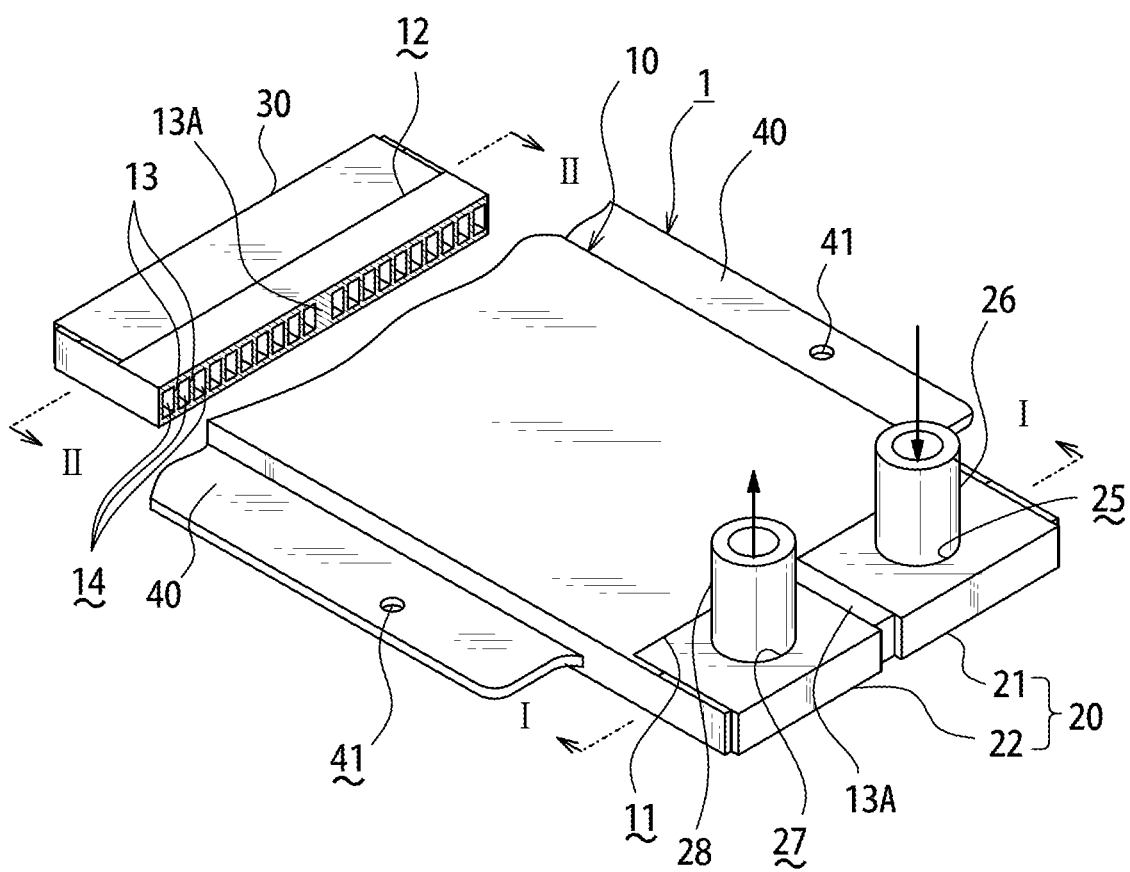
FIG. 1 is a perspective view for illustrating a cooler according to the present invention, with a partial cross section.
Figure 2A:
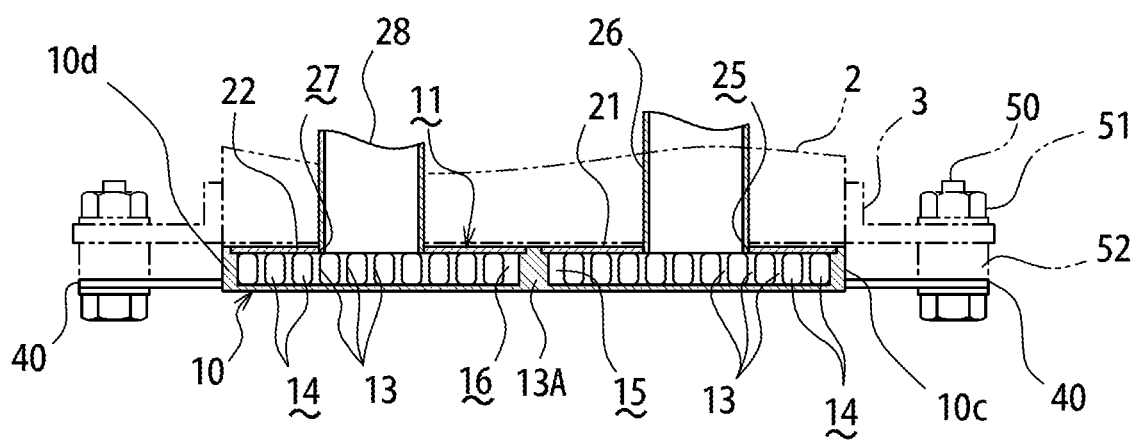
FIG. 2(a) is a sectional view taken along the line I-I of FIG. 1.
Figure 2B:
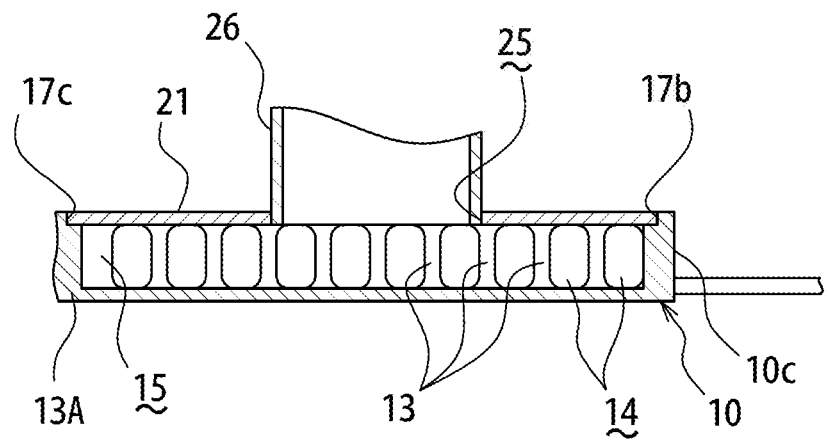
FIG. 2(b) is an enlarged sectional view for illustrating the right half of FIG. 2(a).
Figure 2C:
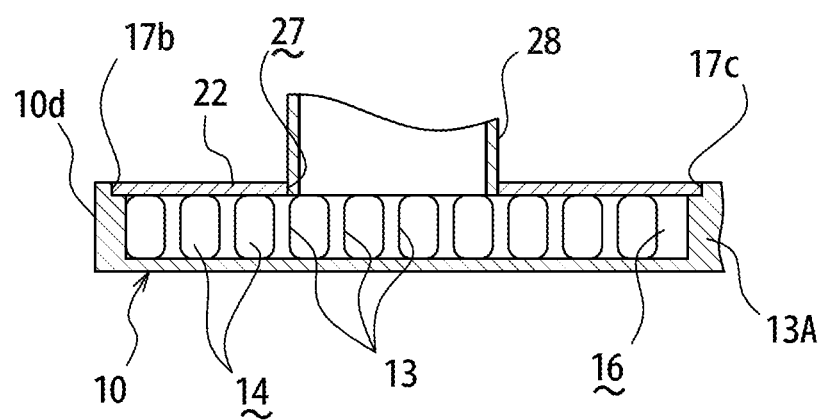
FIG. 2(c) is an enlarged sectional view for illustrating the left half of FIG. 2(a).
Figure 3A:
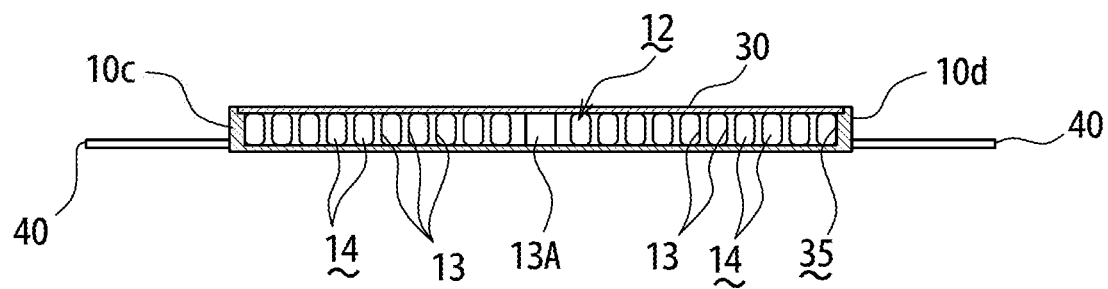
FIG. 3(a) is a sectional view taken along the line II-II of FIG. 1.
Figure 3B:
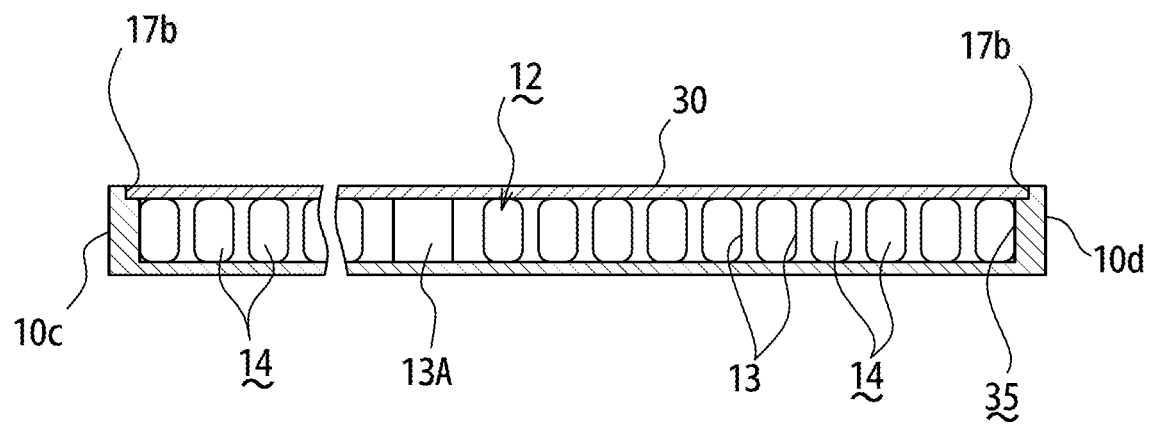
FIG. 3(b) is an enlarged sectional view in which part of FIG. 3(a) is omitted.

As illustrated in FIG. 1 to FIG. 3, a cooler 1 according to the present invention includes a cooling plate 10, a first refrigerant introduction member 20, and a second refrigerant introduction member 30. The cooling plate 10 is arranged in a bottom portion of a battery 2 to be used as a power supply for a motor configured to drive a vehicle. The first refrigerant introduction member 20 is joined to a first cutout portion 11 formed at one end of the cooling plate 10 in a longitudinal direction. The second refrigerant introduction member 30 is joined to a second cutout portion 12 formed at another end of the cooling plate 10 in the longitudinal direction.

The cooling plate 10 is formed of a flat extruded profile made of an aluminum alloy, specifically made of an aluminum alloy containing 0.35 mass % to 0.9 mass % of Mg and 0.2 mass % to 0.9 mass % of Si, which includes a plurality of refrigerant flow passages 14 partitioned by a plurality of partition walls 13 parallel to each other along the longitudinal direction, and which has a substantially rectangular shape in plan view. In this case, a partition wall 13A at the center is formed so as to be thicker than other partition walls 13, and the refrigerant flow passages 14 are divided into a refrigerant inflow side and a refrigerant outflow side with respect to the partition wall 13A at the center.

In addition, the first cutout portion 11 is formed at one end of the cooling plate 10 in the longitudinal direction. The first cutout portion 11 is opened on an upper side and at an end portion in the longitudinal direction while leaving both side walls 10c and 10d in a width direction and one partition wall, that is, the partition wall 13A at the center.

Figure 4:
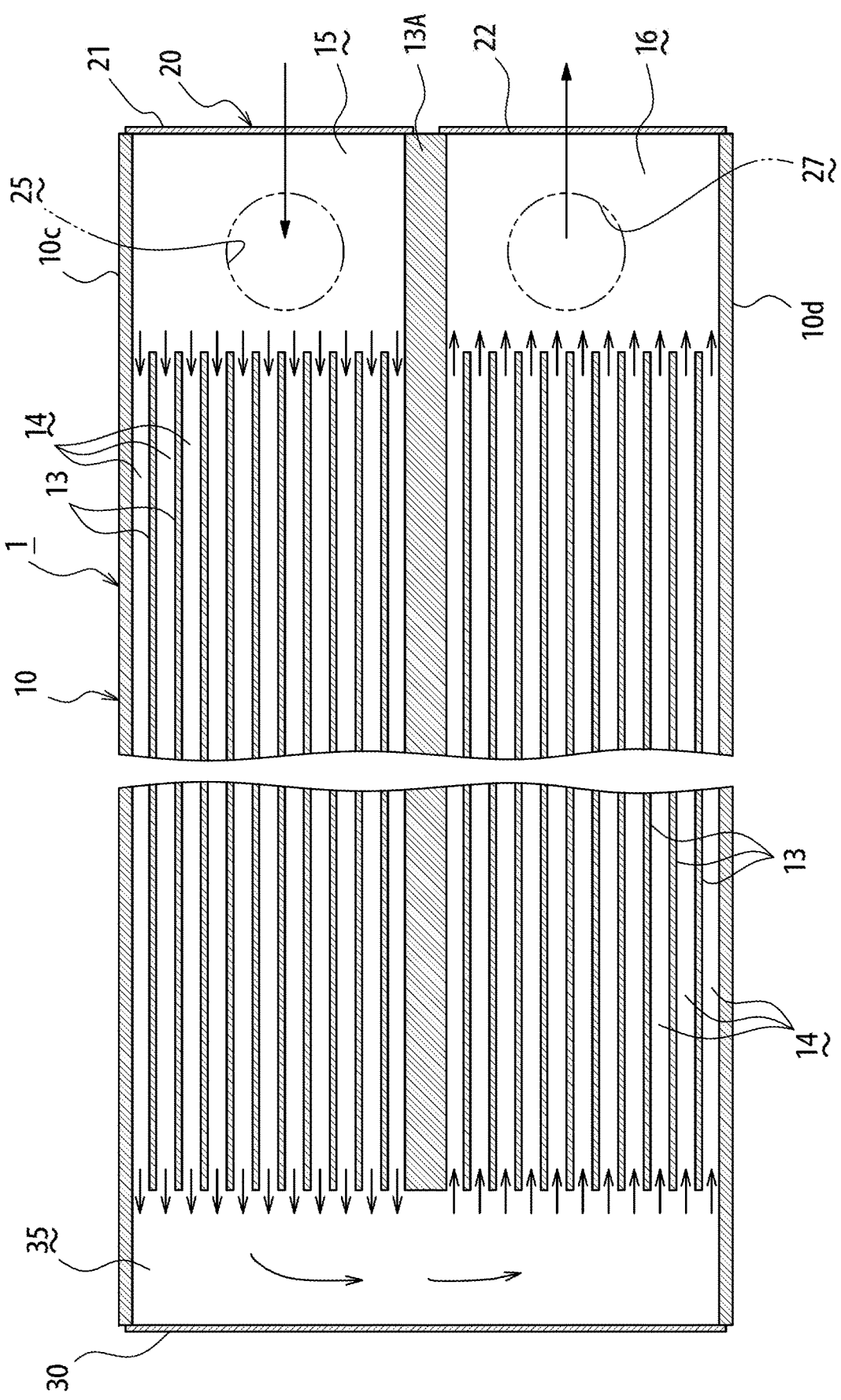
FIG. 4 is a schematic transverse sectional view for illustrating main portions of the cooler according to the present invention.

In this case, as illustrated in FIG. 4, the first cutout portion 11 has a refrigerant inflow side space 15 and a refrigerant outflow side space 16. The refrigerant inflow side space 15 is formed by the partition wall 13A at the center and one side wall 10c. The refrigerant outflow side space 16 is formed by the partition wall 13A at the center and another side wall 10d.

The first refrigerant introduction member 20 joined to the first cutout portion 11 includes a refrigerant inflow side half segment 21 and a refrigerant outflow side half segment 22. The refrigerant inflow side half segment 21 is joined to the first cutout portion 11 so as to fill the refrigerant inflow side space 15 of the first cutout portion 11. The refrigerant outflow side half segment 22 is joined to the first cutout portion 11 so as to fill the refrigerant outflow side space 16 of the first cutout portion 11.

The refrigerant inflow side half segment 21 and the refrigerant outflow side half segment 22 are each formed of a plate material made of an aluminum alloy, which includes a horizontal part 23 that fills an upper portion of the refrigerant inflow side space 15 or the refrigerant outflow side space 16 and a vertical part 24 that fills an end portion in the longitudinal direction.

The horizontal part 23 of the refrigerant inflow side half segment 21 has a refrigerant inflow port 25, and a refrigerant inflow connection pipe 26 made of an aluminum alloy is joined to the refrigerant inflow port 25 through high-frequency brazing described below. In addition, the horizontal part 23 of the refrigerant outflow side half segment 22 has a refrigerant outflow port 27, and a refrigerant outflow connection pipe 28 made of an aluminum alloy is joined to the refrigerant outflow port 27 through high-frequency brazing described below.

Figure 5:
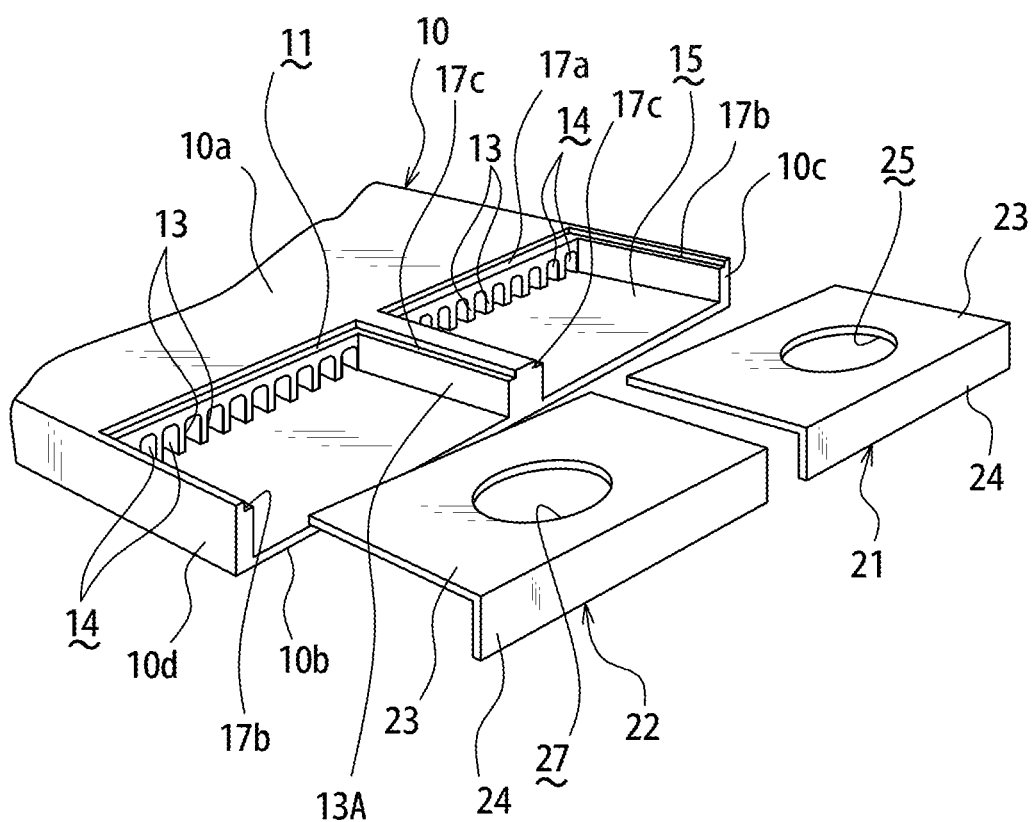
FIG. 5 is an exploded perspective view for illustrating a cooling plate, and a refrigerant inflow side half segment and a refrigerant outflow side half segment which form a first refrigerant introduction member in the present invention.

As illustrated in FIG. 5, the refrigerant inflow side half segment 21 and the refrigerant outflow side half segment 22 are each joined to a step portion 17a formed at an opening end of an upper part 10a of the cooling plate 10, side wall step portions 17b formed at upper ends of both the side walls 10c and 10d, partition wall step portions 17c formed at upper ends of the partition wall 13A at the center, and end portions of both the side walls 10c and 10d on the one end side through high-frequency brazing described below. With this, the upper part 10a of the cooling plate 10 and the horizontal parts 23 of the refrigerant inflow side half segment 21 and the refrigerant outflow side half segment 22 are in the same plane.

Meanwhile, the second cutout portion 12 is formed at another end of the cooling plate 10 in the longitudinal direction. The second cutout portion 12 is opened on an upper side and at an end portion in the longitudinal direction while leaving both the side walls 10c and 10d in the width direction.

The second refrigerant introduction member 30 joined to the second cutout portion 12 is formed of a plate material made of an aluminum alloy, which includes a horizontal part 31 that fills an upper portion of both the side walls 10c and 10d and a vertical part 32 that fills an end portion in the longitudinal direction.

Figure 6:
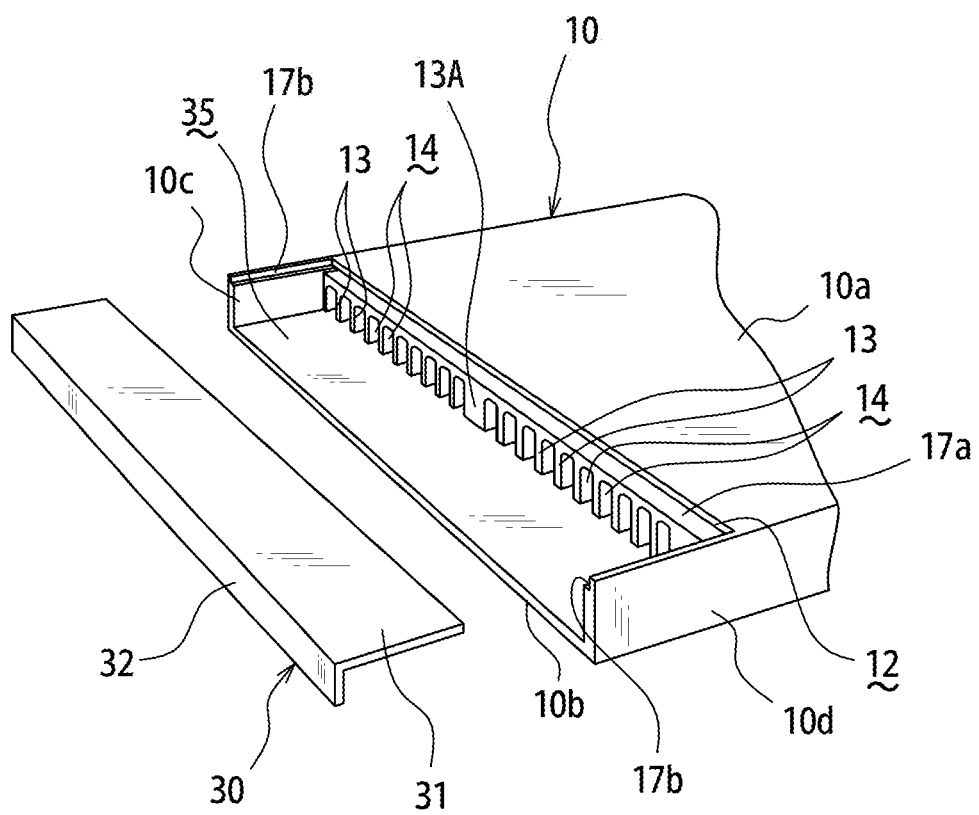
FIG. 6 is an exploded perspective view for illustrating the cooling plate and a second refrigerant introduction member in the present invention.
Figure 7A:
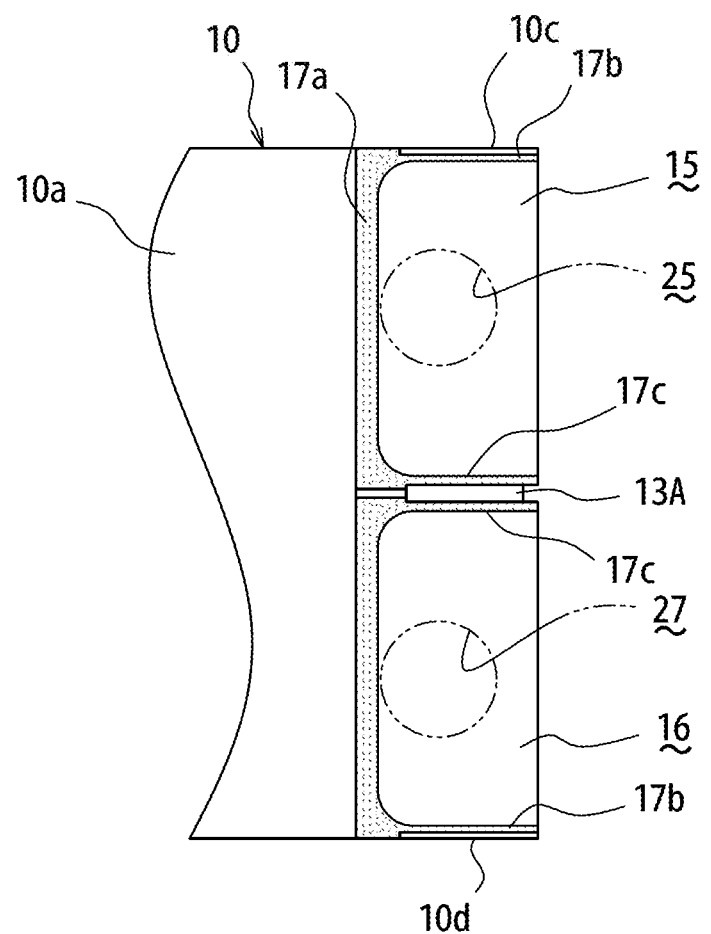
FIG. 7(a) is a plan view for illustrating a joint portion between the cooling plate and the first refrigerant introduction member in the present invention.
Figure 7B:
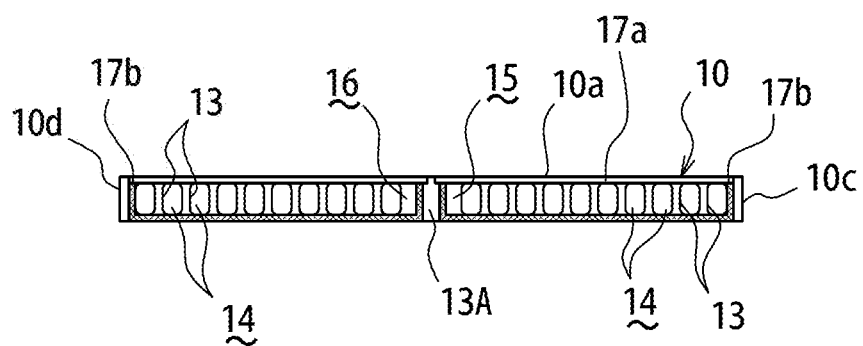
FIG. 7(b) is a side view for illustrating the joint portion between the cooling plate and the first refrigerant introduction member in the present invention.
Figure 8A:
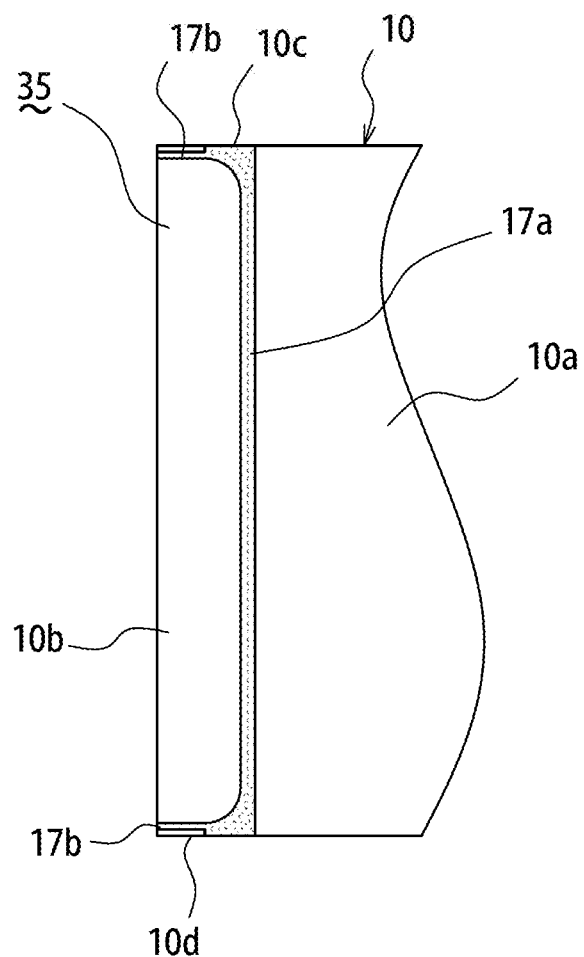
FIG. 8(a) is a plan view for illustrating a joint portion between the cooling plate and the second refrigerant introduction member in the present invention.
Figure 8B:
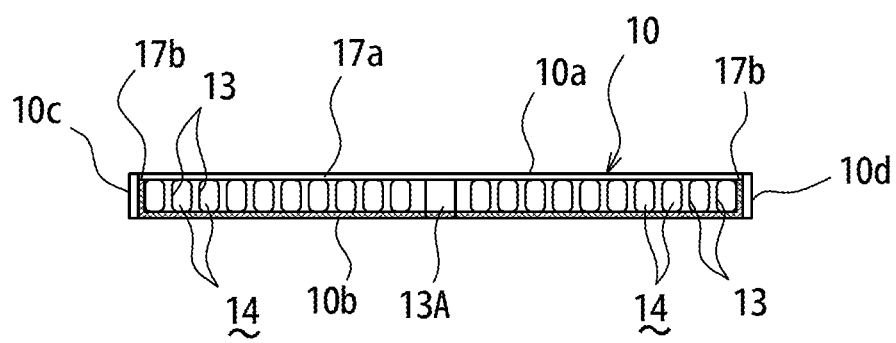
FIG. 8(b) is a side view for illustrating the joint portion between the cooling plate and the second refrigerant introduction member in the present invention.

As illustrated in FIG. 6, the second refrigerant introduction member 30 is joined to a step portion 17a formed at an opening end of the upper part 10a of the cooling plate 10, side wall step portions 17b formed at upper ends of both the side walls 10c and 10d, and end portions of both the side walls 10c and 10d on the other end side through high-frequency brazing described below. With this, the upper part 10a of the cooling plate 10 and the horizontal part 31 of the second refrigerant introduction member 30 are in the same plane. In addition, when the second refrigerant introduction member 30 is joined to the second cutout portion 12, a flow passage space 35 causing the refrigerant inflow side and the refrigerant outflow side to communicate to each other is formed between the second refrigerant introduction member 30 and the cooling plate 10.

Flange portions 40 extend along the longitudinal direction at both ends of the cooling plate 10 in the width direction, and a mounting hole 41 in which a fixing screw 50 can be inserted is formed at an appropriate position of each of the flange portions 40. The fixing screw 50 to be inserted in the mounting hole 41 is inserted in a mounting hole (not shown) formed in a bracket 3 supporting the battery 2 through intermediation of a spacer 52, and a nut 51 is threadedly engaged with the fixing screw 50. Thus, it is possible to arrange the cooler 1 in the bottom portion of the battery 2 (see FIG. 2(a)).

Therefore, the flange portions 40 each have strength in order to securely mount the cooler 1 to the battery 2 and have flatness because mounting accuracy is required.

With the cooler according to the embodiment having the above-mentioned configuration, the first refrigerant introduction member 20, which has the refrigerant inflow port 25 and the refrigerant outflow port 27 respectively communicating to the refrigerant inflow side and the refrigerant outflow side, is joined to the first cutout portion 11 formed at one end of the cooling plate 10 having a flat shape, and the second refrigerant introduction member 30, which forms the flow passage space 35 causing the refrigerant inflow side and the refrigerant outflow side to communicate to each other, is joined to the second cutout portion 12 formed at another end of the cooling plate 10 through brazing. Therefore, as compared to the case in which the refrigerant inflow connection pipe and the refrigerant outflow connection pipe are joined through use of a joint member, the number of components can be decreased, and the space can be reduced.

In addition, the refrigerant inflow side half segment 21 and the refrigerant outflow side half segment 22, which form the first refrigerant introduction member 20, are each joined to the step portion 17a formed at the opening end of the upper part of the cooling plate 10, the side wall step portions 17b formed at the upper ends of both the side walls 10c and 10d, the partition wall step portions 17c formed at the upper ends of the partition wall 13A, and the end portions of both the side walls 10c and 10d on the one end side, and the second refrigerant introduction member 30 is joined to the step portion 17a formed at the opening end of the upper part 10a of the cooling plate 10, the side wall step portions 17b formed at the upper ends of both the side walls 10c and 10d, and the end portions of both the side walls on the other end side. Therefore, joining between the cooling plate 10 and the first refrigerant introduction member 20 (refrigerant inflow side half segment 21 and refrigerant outflow side half segment 22), and joining between the cooling plate 10 and the second refrigerant introduction member 30 can be set easier and stronger.

<Manufacturing Method for Cooler>

Figure 9:
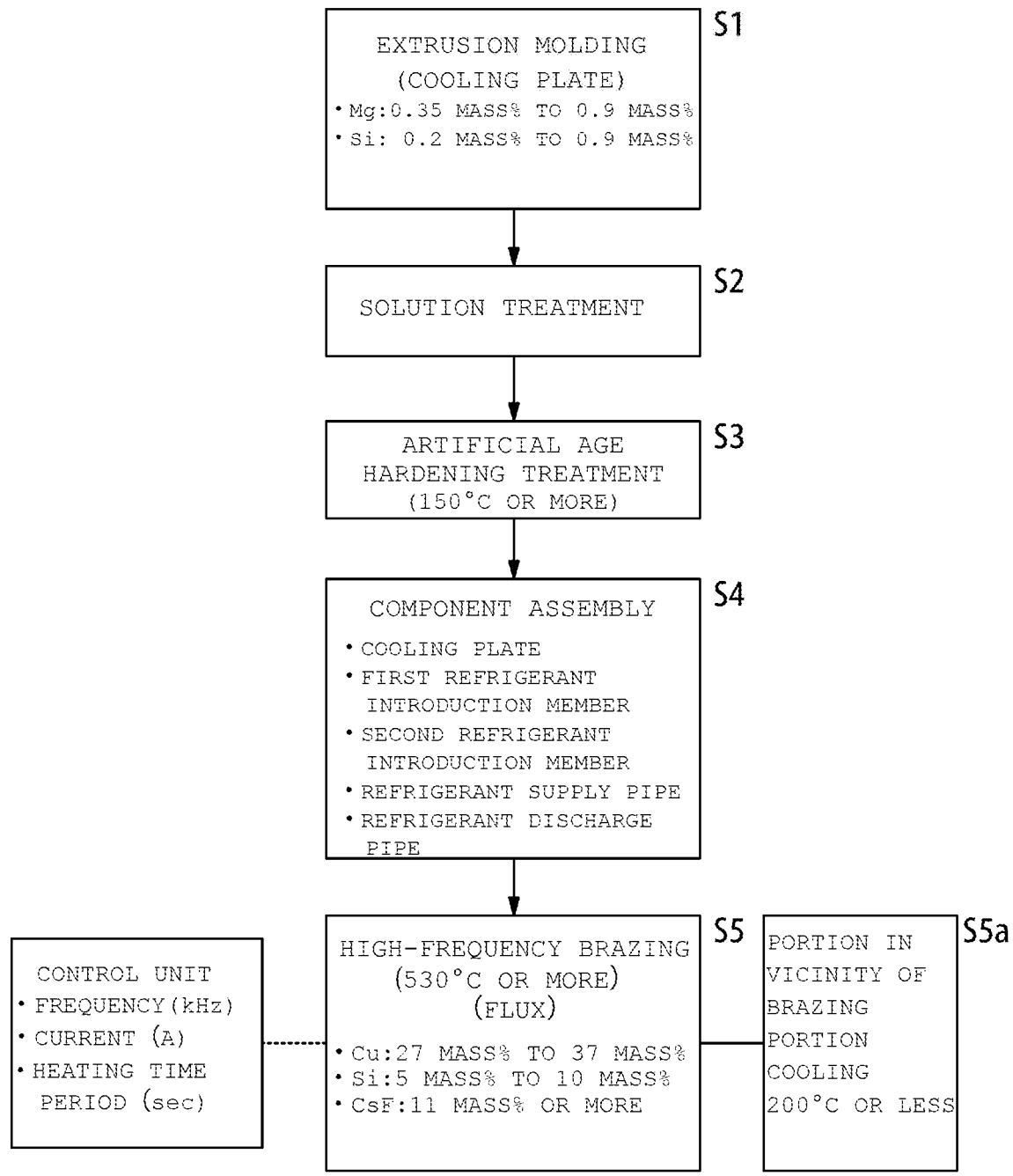
FIG. 9 is a flow chart for illustrating manufacturing steps for the cooler according to the present invention.

In a manufacturing method for a cooler according to the present invention, as illustrated in FIG. 9, first, the cooling plate 10 is produced by subjecting an aluminum alloy containing 0.35 mass % to 0.9 mass % of Mg and 0.2 mass % to 0.9 mass % of Si to extrusion molding (Step S1).

Herein, the reason why the content of Mg is limited to 0.35 mass % to 0.9 mass % is as described below. When the content of Mg is less than 0.35 mass %, a strength increasing effect is not obtained through artificial age hardening treatment described below. Meanwhile, Mg vaporizes at around 550° C. and inhibits a brazing property, and hence when Mg is contained at above 0.9 mass %, preferably above 0.6 mass %, the brazing property is reduced. A factor for inhibiting the brazing property described above is a factor for reducing the brazing property, such as waste of the flux owing to generation of magnesium fluoride (MgF2) and a reduction in wettability owing to generation of magnesium oxide (MgO) caused by the vaporization of Mg at around 550° C.

In addition, the reason why the content of Si in the cooling plate 10 is limited to from 0.2 mass % to 0.9 mass % is as described below. When the content of Si is less than 0.2 mass %, a strength increasing effect is not obtained through artificial age hardening treatment described below. Meanwhile, when the content of Si is more than 0.9 mass %, the melting point of the cooling plate 10 (base material) is reduced, and local melting occurs at the time of brazing.

Next, the cooling plate 10 is subjected to solution treatment (Step S2) and subsequent quenching, followed by being subjected to artificial age hardening treatment (Step S3). In this case, the artificial age hardening treatment is performed at a temperature of 150° C. or more. With this, a strength increasing effect on the cooling plate 10 is obtained through the artificial age hardening treatment.

The cooling plate 10 having been subjected to the artificial age hardening treatment is processed so that the first cutout portion 11 is formed at the one end in the longitudinal direction, the second cutout portion 12 is formed at the other end, and the refrigerant inflow side space 15, the refrigerant outflow side space 16, the step portions 17a, 17b, and 17c, and the like are formed as described above.

Next, the first refrigerant introduction member 20, the second refrigerant introduction member 30, the refrigerant supply pipe 26, and the refrigerant discharge pipe 28 prepared in advance are assembled to the cooling plate 10 produced as described above (Step S4). Then, a connecting portion of the cooling plate 10, the first refrigerant introduction member 20, the second refrigerant introduction member 30, the refrigerant supply pipe 26, and the refrigerant discharge pipe 28 is subjected to high-frequency brazing with the aluminum alloy brazing filler metal in a powder form containing 27 mass % to 37 mass % of Cu and 5 mass % to 10 mass % of Si, with the balance being Al and inevitable impurities, and the fluoride-based flux containing 11 mass % or more of CsF as a solid content through heating through application of a high-frequency current to a high-frequency heating coil located at the connecting portion of the cooling plate 10, the first and second refrigerant introduction members 20 and 30, the refrigerant supply pipe 26, and the refrigerant discharge pipe 28 (Step S5).

Herein, the reason why the fluoride-based flux containing 11 mass % or more of CsF as a solid content is used is as described below. When the content of CsF is less than 11 mass %, the melting temperature of the flux is not reduced sufficiently, and hence the brazing cannot be performed at 530° C.

During the high-frequency brazing, a frequency (kHz), a current (A), a heating time period (sec), and the like are controlled by a control unit so that the brazing is performed at a temperature of 530° C. or more.

When a portion in the vicinity of a brazing portion is required to have strength and flatness at the time of high-frequency brazing, it is desired to perform the brazing while cooling the vicinity portion with a refrigerant for cooling in order to prevent softening of the vicinity portion owing to an increase in temperature through thermal conduction from the brazing portion (a portion to be heated) (Step 5a).

Figure 9A:
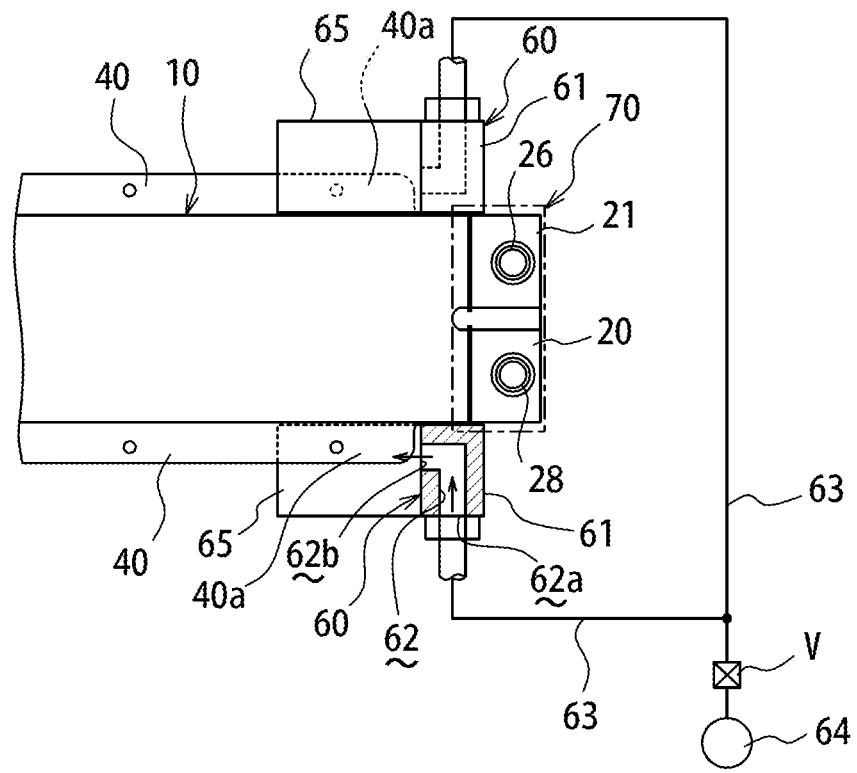
FIG. 9A is a schematic plan view for illustrating an example of a cooling method for a portion in the vicinity of a brazing portion in the present invention.

An example of a cooling method in this case is described with reference to FIG. 9A and FIG. 9B. A case in which the end portion of the cooling plate 10 in the longitudinal direction in the vicinity of a brazing portion 70 and an end portion 40a of the flange portion 40 are cooled by cooling means 60 is illustrated in FIG. 9A.

The cooling means 60 includes: a nozzle block 61 including a refrigerant flow passage 62 causing a refrigerant inflow port 62a and a refrigerant outflow port 62b to communicate to each other; and a refrigerant supply source 64 connected to the refrigerant inflow port 62a of the nozzle block 61 through a refrigerant supply pipe 63 in which a valve V is arranged. In this case, the nozzle block 61 is formed of a material which has heat resistance and does not induce high-frequency, for example, a member made of an ethylene tetrafluoride resin. Accordingly, the nozzle block 61, which is formed of a material which does not induce high-frequency, is in no danger of generating heat in its material itself, and hence can be used in the vicinity of the heating coil.

Under the state in which the refrigerant outflow port 62b in the nozzle block 61 of the cooling means 60 having the above-mentioned configuration is arranged toward an end portion 3a side of the bracket 3 in the longitudinal direction, the refrigerant for cooling having outflowed from the refrigerant outflow port 62b is caused to flow toward an end portion 40a side of the flange portion 40, to thereby keep the temperature of the end portion 40a of the flange portion 40 at, for example, 200° C. or less.

A pair of upper and lower guard plates 65 for preventing diffusion are arranged on a refrigerant outflow port 62b side of the nozzle block 61 in order to prevent diffusion of the refrigerant for cooling into the brazing portion 70.

In this case, a liquid, such as water, an alcohol, or a mixture liquid thereof, or compressed air may be used as the refrigerant for cooling.

For example, in the case of the liquid, the liquid removes heat as its vaporization heat when vaporizing at 100° C., and hence when the refrigerant for cooling (liquid) is supplied to the extent that the refrigerant for cooling (liquid) is not exhausted owing to vaporization, softening of the flange portion 40 owing to high heat can be prevented.

In addition, in the case of the compressed air, a temperature may be controlled by the flow rate of air on the refrigerant outflow port 62b side (a side on which air is ejected). For example, in an embodiment illustrated in FIG. 9A and FIG. 9B, cooling may be performed at a pressure of 0.1 MPa or more.

The case in which the refrigerant for cooling is the liquid, such as water, an alcohol, or a mixture liquid thereof, or the compressed air is described in the above-mentioned embodiment, but instead of the embodiment, a gel refrigerant for cooling, for example, COOLGEL (trademark: manufactured by LA-CO Industries, Inc.) may be allowed to adhere to the end portion 40a of the flange portion 40 through use of a spray-type nozzle (not shown) to cool the end portion 40a.

Figure 9B:
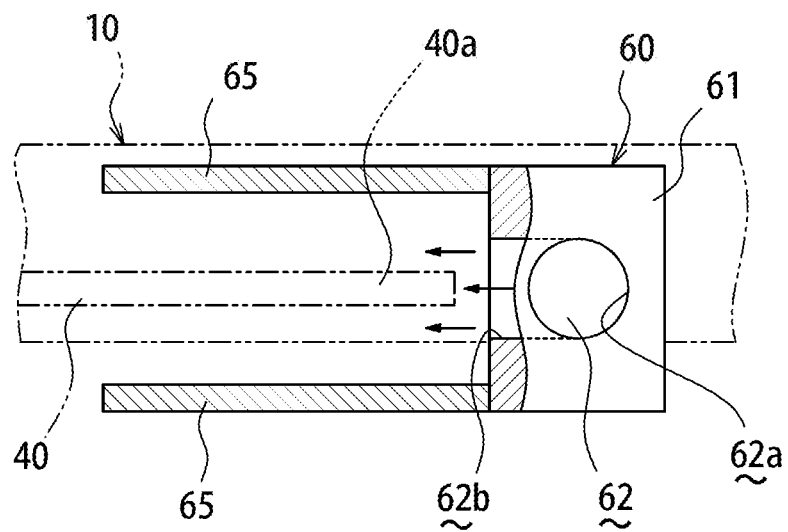
FIG. 9B is a partial enlarged sectional view for illustrating a cooling portion of FIG. 9A.

When the refrigerant for cooling is the compressed air, the guard plates 65 for preventing diffusion may have simplified structures as illustrated in FIG. 9B. However, when the refrigerant for cooling is the liquid or gel medium described above, the lower guard plate 65 for preventing diffusion is desirably formed into a dish shape so that the refrigerant for cooling accumulates in a portion to be cooled.

As described above, when the end portion 40a of the flange portion 40 in the vicinity of the brazing portion 70 is cooled by the external cooling means 60, softening of the end portion of the cooling plate 10 in the longitudinal direction in the vicinity of the brazing portion 70 and the end portion 40a of the flange portion 40 owing to an increase in temperature through thermal conduction from the brazing portion 70 (a portion to be heated) can be prevented.

Figure 9C:
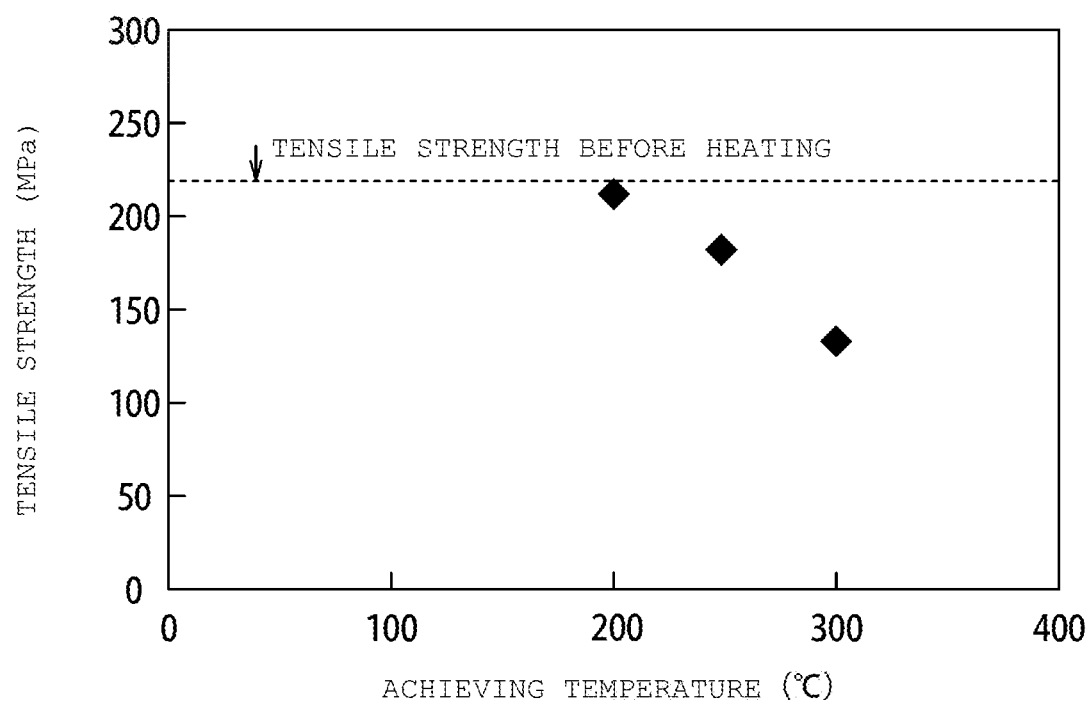
FIG. 9C is a graph for showing a relationship between tensile strength and a cooling temperature (achieving temperature).

In this case, as illustrated in FIG. 9C, when the cooling temperature (achieving temperature) of the end portion 40a of the flange portion 40 exceeds 200° C., tensile strength is reduced. Therefore, it is desired to perform cooling under the conditions in which the cooling temperature (achieving temperature) does not exceed 200° C.

According to the manufacturing method for a cooler of the above-mentioned embodiment, a difference from the melting temperature (610° C. or more) of the cooling plate 10 (base material) is increased, and hence temperature control at the time of brazing is facilitated. In addition, through use of high-frequency, a time period required for the brazing can be shortened.

In addition, the brazing can be performed at a temperature (530° C.) lower than about 550° C. at which Mg volatilizes, and hence softening of a material and heat strain caused through heating at the time of brazing are suppressed, and thus the airtightness and flatness of the cooler 1 can be improved. Thus, the strength and thermal conductivity of the constituent member of the cooler 1 can be increased.

In addition, the brazing of the cooling plate 10 containing Mg is facilitated, and hence an increase in strength can be achieved.

Further, a particular portion in the vicinity of the brazing portion 70 (a portion to be heated) to be subjected to the high-frequency brazing, for example, the end portion of the cooling plate 10 in the longitudinal direction and the end portion 40a of the flange portion 40 can be cooled to be kept at a temperature or less at which the strength is not impaired, and hence temperature control at the time of brazing is further facilitated, with the result that the strength of the cooling plate 10 and the flange portion 40 constituting the cooler 1 can be increased and the flatness of these members can be maintained.

In addition, the cooling may be performed by the external cooling means 60, and hence the above-mentioned particular portion, for example, the end portion of the cooling plate 10 in the longitudinal direction and the end portion 40a of the flange portion 40 can be appropriately cooled without influences on the shapes of these portions.

Examples

Next, a test for examining the brazing property, flatness, and strength of each of the cooler 1 produced by the manufacturing method according to the present invention (Example), a conventional cooler produced through furnace brazing (Comparative Example 1), and a conventional cooler produced through torch brazing (Comparative Example 2) is described.

Figure 10:
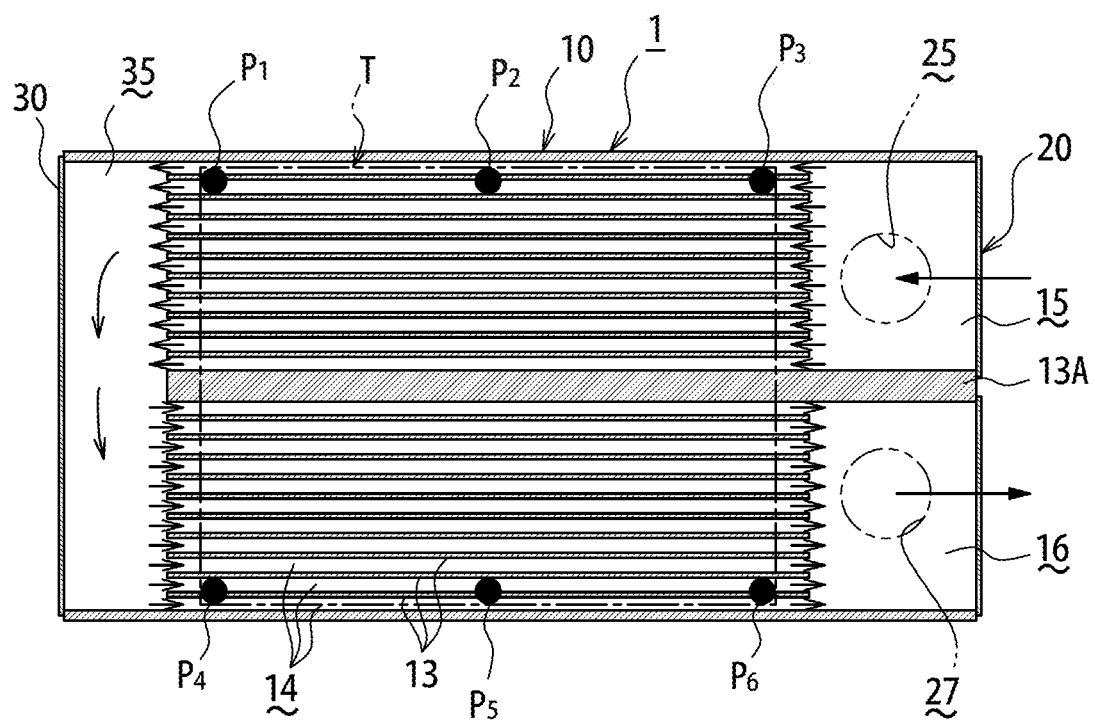
FIG. 10 is an explanatory view for illustrating a flatness evaluation region and strength evaluation points in the cooler in the present invention serving as a typical example.

<Test Piece (Cooler)>
Test pieces having the same dimensions (extrusion processed articles each made of an aluminum alloy containing 0.35 mass % to 0.9 mass % of Mg and 0.2 mass % to 0.9 mass % of Si and subjected to solution treatment, followed by heat treatment at 150° C. or more)
<Brazing Filler Metal>
Example: Aluminum alloy brazing filler metal in a powder form containing 27 mass % to 37 mass % of Cu and 5 mass % to 10 mass % of Si, with the balance being Al and inevitable impurities
Comparative Example 1: Clad material
Comparative Example 2: Clad material
<Flux>
Example: Fluoride-based flux containing 11 mass % or more of CsF as a solid content
Comparative Example 1: KF-AlF3-based flux
Comparative Example 2: KF-AlF3-based flux
<Evaluation>
Brazing property: A joint portion was visually observed.
Flatness: Measurement was performed in the region T illustrated in FIG. 10 with a three-dimensional measurement device.
Strength: Test pieces for a tensile test of JIS No. 5 were collected at 6 points (P1, P2, P3, P4, P5, and P6) illustrated in FIG. 10, and were measured for tensile strength with a 50 kN autograph.

Figure 11:
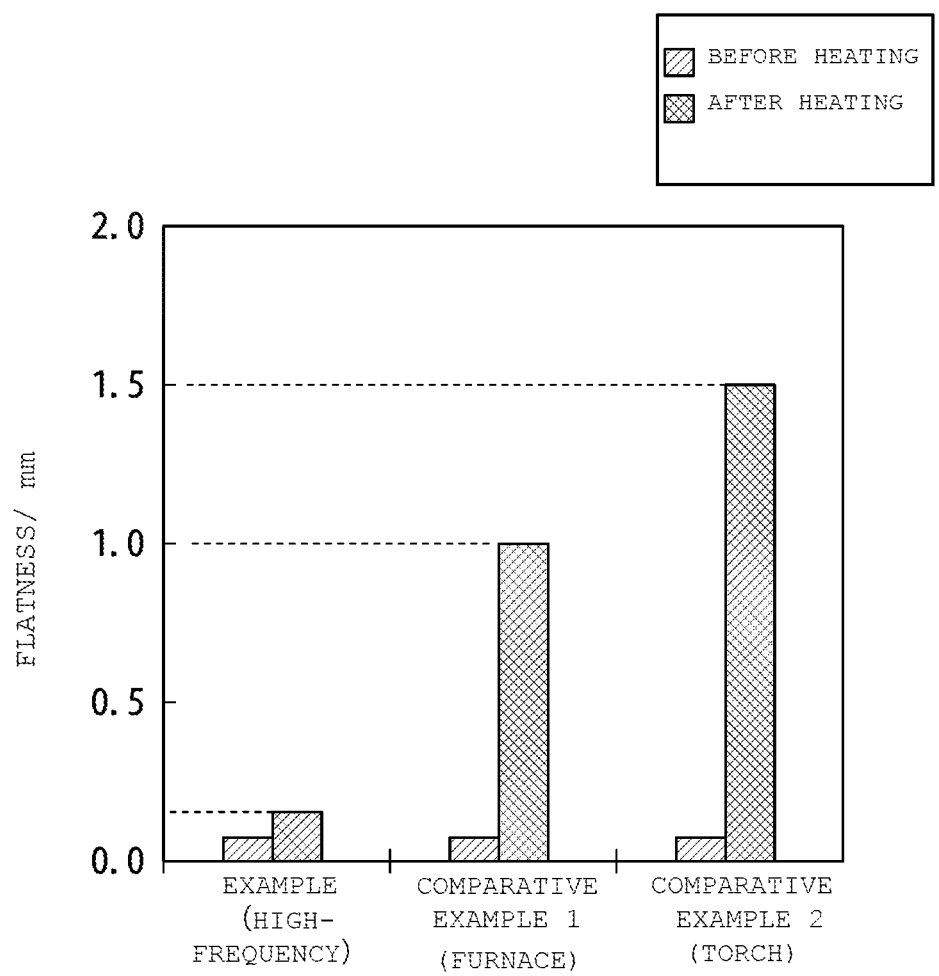
FIG. 11 is a graph for showing flatness in Example of the cooler in the present invention and Comparative Examples 1 and 2.

The test was performed in Example and Comparative Examples 1 and 2 under the above-mentioned conditions, and as a result, evaluation results shown in FIG. 11 and Table 1 were obtained.

TABLE 1

| | Brazing method | Brazing filler metal | Flux | Brazing property | Flatness (Dimensional change amount) | Strength of battery mounting portion |
|---|---|---|---|---|---|---|
| Example | High-frequency | Powder | CsF-containing | Good | 0.2 mm | 185 MPa or more |
| Comparative Example 1 | Furnace | Clad material | KF—AlF3-based | Good | 1 mm | 150 MPa or less |
| Comparative Example 2 | Torch | Clad material | KF—AlF3-based | Base material melting | 1.5 mm | 185 MPa or more |

* Powder . . . Aluminum alloy brazing filler metal in a powder form containing 27 mass % to 37 mass % of Cu and 5 mass % to 10 mass % of Si, with the balance being Al and inevitable impurities
CsF-containing . . . Fluoride-based flux containing 11 mass % or more of CsF as a solid content As a result of the above-mentioned test, the brazing property was good in each of Example and Comparative Example 1, but the base material (cooling plate) melted in Comparative Example 2. The flatness was 0.2 mm in Example. In contrast, the flatness was 1 mm in Comparative Example 1 and 1.5 mm in Comparative Example 2. In addition, the strength was 185 MPa or more in each of Example and Comparative Example 2, but was 150 MPa or less in Comparative Example 1.

From the above-mentioned results, it was revealed that the brazing property, the flatness, and the strength were at sufficiently satisfactory levels in Example, that is, in the manufacturing method for a cooler according to the present invention.

The case in which the high-frequency brazing is performed with the aluminum alloy brazing filler metal containing 27 mass % to 37 mass % of Cu and 5 mass % to 10 mass % of Si, with the balance being Al and inevitable impurities, and the fluoride-based flux containing 11 mass % or more of CsF as a solid content is described in the above-mentioned embodiment, but high-frequency brazing with a KF-AlF3-based flux and a clad material without using the fluoride-based flux containing CsF and the brazing filler metal containing Cu may be performed while the portion in the vicinity of the brazing portion is cooled by the cooling means 60 using the refrigerant for cooling as in the above-mentioned embodiment.

In this case, the shape, heating position, frequency, current, and the like of the high-frequency heating coil need to be controlled.

Also in this embodiment, a particular portion in the vicinity of the brazing portion 70 (a portion to be heated) to be subjected to the high-frequency brazing, for example, the end portion of the cooling plate 10 in the longitudinal direction and the end portion 40a of the flange portion 40 can be cooled to be kept at a temperature or less at which the strength is not impaired, and hence temperature control at the time of brazing is further facilitated, with the result that the strength of the cooling plate 10 and the flange portion 40 constituting the cooler 1 can be increased and the flatness of these members can be maintained.

In addition, the cooling may be performed by the external cooling means 60, and hence the above-mentioned particular portion, for example, the end portion of the cooling plate 10 in the longitudinal direction and the end portion 40a of the flange portion 40 can be appropriately cooled without influences on the shapes of these portions.

REFERENCE SIGNS LIST 10 cooler
11 first cutout portion
12 second cutout portion
13, 13A partition wall
14 refrigerant flow passage
15 refrigerant inflow side space
20 first refrigerant introduction member
25 refrigerant inflow port
26 refrigerant supply pipe
27 refrigerant outflow port
28 refrigerant discharge pipe
30 second refrigerant introduction member
35 flow passage space
40 flange portion
40a end portion of flange portion (portion in vicinity of brazing portion)
60 cooling means
61 nozzle block
62 refrigerant flow passage
62a refrigerant inflow port
62b refrigerant outflow port
64 refrigerant supply source
70 brazing portion

The invention claimed is:

1. A manufacturing method for a cooler, the manufacturing method comprising brazing:
   a cooling plate made of an aluminum alloy containing 0.35 mass % to 0.9 mass % of Mg and 0.2 mass % to 0.9 mass % of Si, which comprises a plurality of refrigerant flow passages along a longitudinal direction, and which is formed into a substantially flat rectangular shape in cross section with a flat upper part and a flat lower part facing each other;
   a first refrigerant introduction member and a second refrigerant introduction member each made of an aluminum alloy, which are connected to end portions of the cooling plate in the longitudinal direction; and
   a refrigerant supply pipe and a refrigerant discharge pipe each made of an aluminum alloy, which are connected to a refrigerant supply port and a refrigerant discharge port, respectively, the refrigerant supply port and the refrigerant discharge port being arranged in one of the first refrigerant introduction member and the second refrigerant introduction member, to each other,
wherein the brazing includes subjecting a connecting portion of the cooling plate, the first refrigerant introduction member and the second refrigerant introduction member, the refrigerant supply pipe, and the refrigerant discharge pipe to high-frequency brazing through heating with a high-frequency heating coil while cooling a portion in a vicinity of a brazing portion by cooling means using a refrigerant for cooling, and
the manufacturing method further comprises:
   forming the cooling plate as an extruded profile;
   forming a first cutout portion at one end of the cooling plate in the longitudinal direction, the first cutout portion being opened on an upper side and at an end portion in the longitudinal direction while leaving both side walls in a width direction and a partition wall, and forming, in the first cutout portion, a step portion at an opening end of the upper part, side wall step portions at upper ends of both the side walls, and partition wall step portions at upper ends of the partition wall;
   forming a second cutout portion at another end of the cooling plate in the longitudinal direction, the second cutout portion being opened on the upper side and at an end portion in the longitudinal direction while leaving both the side walls in the width direction, and forming, in the second cutout portion, a step portion at an opening end of the upper part, and side wall step portions at upper ends of both the side walls;
   high-frequency brazing a refrigerant supply side half segment and a refrigerant discharge side half segment to the step portion, the side wall step portions, and the partition wall step portions in the first cutout portion, and end portions of both the side walls on one end side, the refrigerant supply side half segment comprising a horizontal part in which the refrigerant supply port is arranged and constituting the first refrigerant introduction member, the refrigerant discharge side half segment comprising a horizontal part in which the refrigerant discharge port is arranged and constituting the first refrigerant introduction member; and high-frequency brazing the second refrigerant introduction member comprising a horizontal part to the step portion in the second cutout portion and end portions of both the side walls on another end side.

2. A manufacturing method for a cooler according to claim 1, wherein the refrigerant for cooling comprises any one of water, an alcohol, a mixture liquid thereof, compressed air, or a gel medium.

3. A manufacturing method for a cooler according to claim 2, wherein a cooling temperature of the portion in the vicinity of the brazing portion is 200° C. or less.

4. A manufacturing method for a cooler according to claim 1, wherein a cooling temperature of the portion in the vicinity of the brazing portion is 200° C. or less.

5. A manufacturing method for a cooler according to claim 1, further comprising, before the brazing, subjecting the cooling plate to solution treatment and subsequent quenching, followed by subjecting the cooling plate to artificial age hardening treatment.

6. A manufacturing method for a cooler according to claim 1, wherein the cooling plate includes flange portions for mounting, which extend along the longitudinal direction of the cooling plate on both the side walls of the cooling plate in the width direction.

7. A manufacturing method for a cooler according to claim 6, wherein the brazing includes, at a time of the high-frequency brazing, cooling end portions of the flange portions in the vicinity of the brazing portion by the cooling means using the refrigerant for cooling.

8. A manufacturing method for a cooler according to claim 1, wherein the brazing includes, at a time of the high-frequency brazing, using an aluminum alloy brazing filler metal containing 27 mass % to 37 mass % of Cu and 5 mass % to 10 mass % of Si, with the balance being Al and inevitable impurities, and a fluoride-based flux containing 11 mass % or more of CsF as a solid content.

9. A manufacturing method for a cooler,
the manufacturing method comprising brazing:
a cooling plate made of an aluminum alloy containing 0.35 mass % to 0.9 mass % of Mg and 0.2 mass % to 0.9 mass % of Si, which comprises a plurality of refrigerant flow passages along a longitudinal direction, and which is formed into a substantially flat rectangular shape in cross section with a flat upper part and a flat lower part facing each other;
a first refrigerant introduction member and a second refrigerant introduction member each made of an aluminum alloy, which are connected to end portions of the cooling plate in the longitudinal direction; and
a refrigerant supply pipe and a refrigerant discharge pipe each made of an aluminum alloy, which are connected to a refrigerant supply port and a refrigerant discharge port, respectively, the refrigerant supply port and the refrigerant discharge port being arranged in one of the first refrigerant introduction member and the second refrigerant introduction member, to each other,
wherein the brazing includes subjecting a connecting portion of the cooling plate, the first refrigerant introduction member and the second refrigerant introduction member, the refrigerant supply pipe, and the refrigerant discharge pipe to high-frequency brazing through heating with a high-frequency heating coil while cooling a portion in a vicinity of a brazing portion by cooling means using a refrigerant for cooling, and
the cooling plate includes flange portions for mounting, which extend along the longitudinal direction of the cooling plate on both the side walls of the cooling plate in the width direction.

10. A manufacturing method for a cooler according to claim 9, wherein the brazing includes, at a time of the high-frequency brazing, cooling end portions of the flange portions in the vicinity of the brazing portion by the cooling means using the refrigerant for cooling.

11. A manufacturing method for a cooler according to claim 9, wherein the refrigerant for cooling comprises any one of water, an alcohol, a mixture liquid thereof, compressed air, or a gel medium.

12. A manufacturing method for a cooler according to claim 11, wherein a cooling temperature of the portion in the vicinity of the brazing portion is 200° C. or less.

13. A manufacturing method for a cooler according to claim 9, wherein a cooling temperature of the portion in the vicinity of the brazing portion is 200° C. or less.

14. A manufacturing method for a cooler according to claim 9, further comprising, before the brazing, subjecting the cooling plate to solution treatment and subsequent quenching, followed by subjecting the cooling plate to artificial age hardening treatment.

15. A manufacturing method for a cooler according to claim 9, wherein the brazing includes, at a time of the high-frequency brazing, using an aluminum alloy brazing filler metal containing 27 mass % to 37 mass % of Cu and 5 mass % to 10 mass % of Si, with the balance being Al and inevitable impurities, and a fluoride-based flux containing 11 mass % or more of CsF as a solid content.

* * * * *